Figure 1:
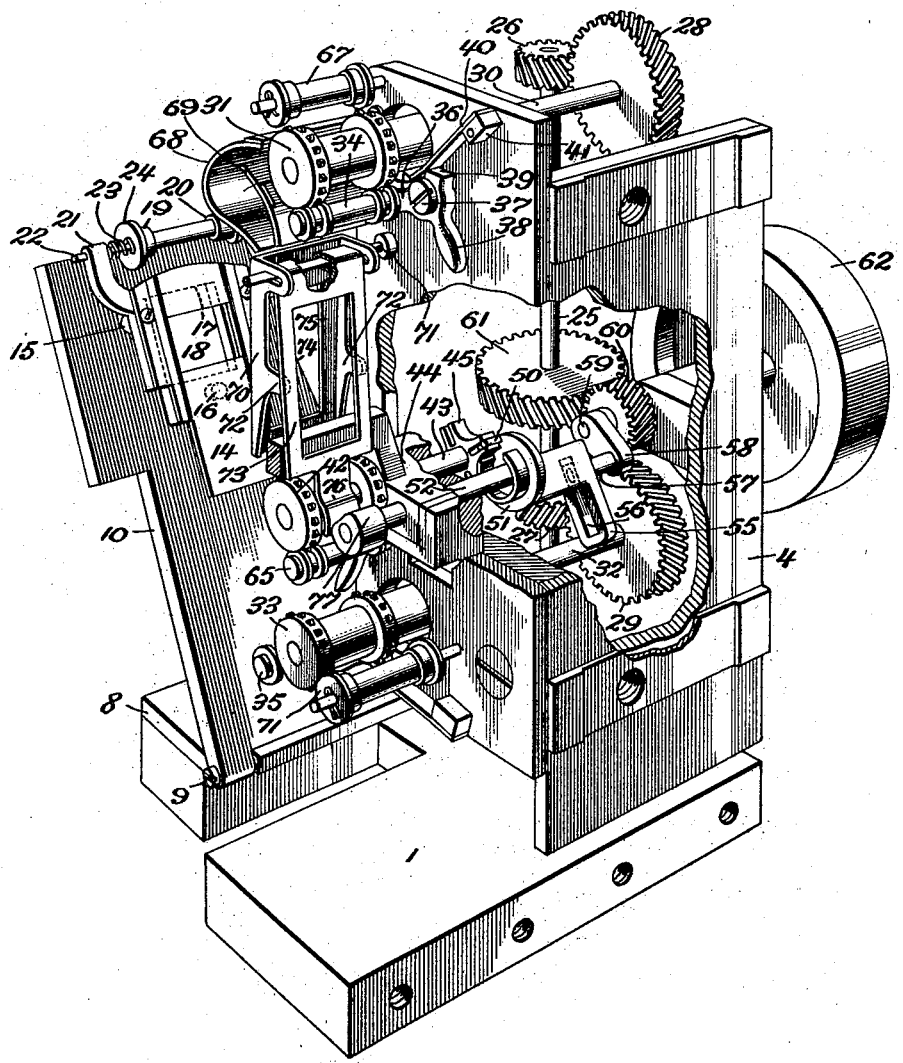

Apr. 3, 1923.  1,450,514

C. F. PERHAM

MOTION PICTURE PROJECTION

Filed May 6, 1921  2 sheets-sheet 1

Inventor:
Charles F. Perham,
by Albert G. Davis
His Attorney

Apr. 3, 1923.
C. F. PERHAM
1,450,514
MOTION PICTURE PROJECTION
Filed May 6, 1921
2 sheets-sheet 2
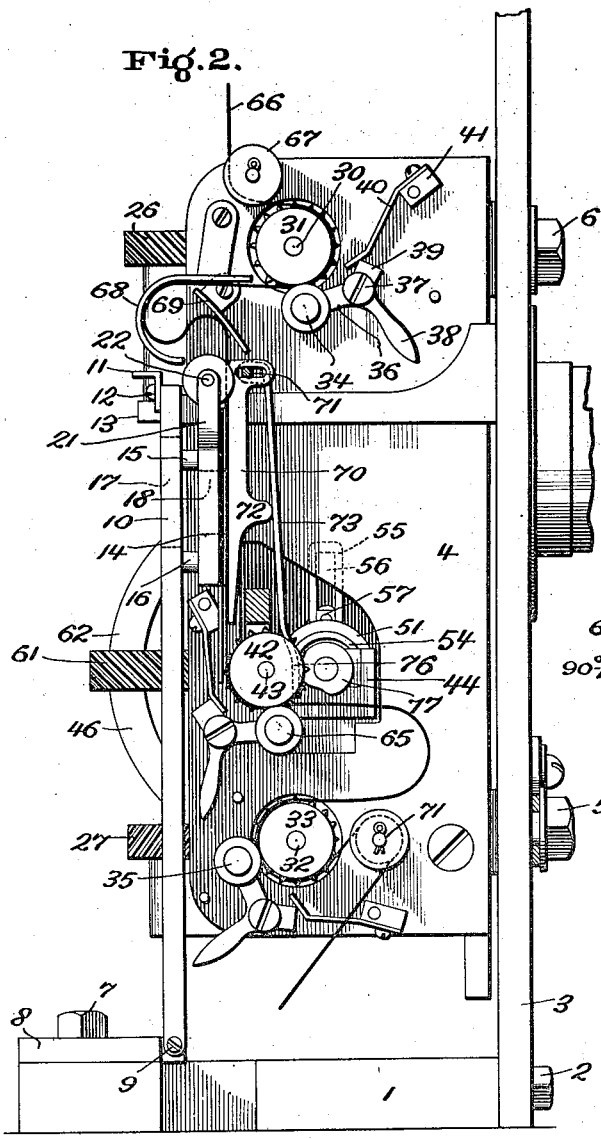
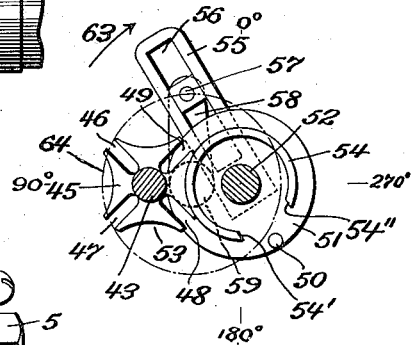
Inventor:
Charles F. Perham,
by Albert G. Davis
His Attorney Patented Apr. 3, 1923.

1,450,514

UNITED STATES PATENT OFFICE.

CHARLES F. PERHAM, OF LYNN, MASSACHUSETTS, ASSIGNOR TO GENERAL ELECTRIC COMPANY, A CORPORATION OF NEW YORK.

MOTION-PICTURE PROJECTION.

Application filed May 6, 1921. Serial No. 467,426.

*To all whom it may concern:*

Be it known that I, CHARLES F. PERHAM, a citizen of the United States, residing at Lynn, in the county of Essex, State of Massachusetts, have invented certain new and useful Improvements in Motion-Picture Projections, of which the following is a specification.

My invention embraces a method of and apparatus for motion picture projection and it aims at and effects a clearer definition of the images projected upon the screen than has heretofore been accomplished.

In commercial motion picture projection each picture on the film is uncovered to the lens by which the image is focused upon the screen during a certain period of time; it is then moved off the lens and the next picture is moved onto the same. In common practice about sixteen pictures are, during the time of one second, projected upon the screen, and in the following description this will be assumed to be the rule, in order to simplify the exposition of my invention.

In commercial practice it takes an appreciable time for removing one picture from the lens and substituting for it the next succeeding picture, and this period I shall hereinafter call the period of transition.. It is necessary that any one of the images projected upon the screen remain there fixed long enough to make a sufficiently lasting impression upon the eye of the beholder, and this period has been called and will hereinafter be called the period of dwell. During the period of transition the lens is obscured by a shutter so that the images on the screen are in succession flashed between periods of darkness, the aggregated time of the periods of transition and dwell being $\frac{1}{16}$ of a second. It has been the endeavor of inventors to reduce the periods of obscuration as much as possible in favor of the periods of dwell for three reasons; first, because each period of obscuration reduces the total amount of light which reaches the eye of the observer from the screen; second, because long periods of obscuration compel the observer to accommodate his eye-sight in rapid succession to comparative darkness and bright light, and third, because the lengthening of the period of dwell makes a more lasting impression upon the eye of the observer. One of the practical consequences of the alternate periods of darkness and illumination is that the images and particularly the dark portions of the same, receive vertical light stratifications which impair the definition. These light stratifications are spoken of in art as "travel ghosts."

The main object of my invention is to eliminate the "travel ghost" or reduce it to such an extent that it is barely perceptible, and I accomplish this result by discarding the periods of obscuration altogether, so that during the period of transition the light is never removed from the screen. In order to be able to do this, it is necessary that the period of transition be made practically zero, by accelerating the transition of the film to such an extent that the movement of an image from and onto the screen is practically imperceptible to the eye.

This extraordinary speed is imposed upon the film only at the region where it moves before the lens, while at all other points the film has or may have the customary uniform speed of 16 pictures per second of time. It has always been the practice of making the intermittent movement of the film before the lens during the period of obscuration more rapid than the uniform speed of the film at all other points; and in consequence thereof it was found necessary to allow the film to become looped before it enters the region of transition. In accordance with my invention this looping of the film is retained, but in order to permit the exceedingly rapid momentary transition movement in accordance with my invention, I make use of the elasticity of the film to facilitate that movement by giving to the loop such curvature that by its resilient rebound it gives to the straight part of the film, an impetus in the direction of the feed, somewhat in the nature of a car starter. In other words, energy is stored in the film at the loop and while it is looping which, when liberated, starts the feed toward the lens.

In order to make the film steady at the region of its exposure, it has been found necessary to apply a gentle brake upon it near that region. In accordance with my invention and in order to facilitate the exceedingly rapid movement during the period of transition, I found it necessary to liberate the film momentarily from the restraint of the brake at the region of transition during that transition.

All this will more fully appear from the following detail description with reference to the accompanying drawing, which shows an apparatus that may be used for the practice of my improved method of operation and which, in the main, is one of the conventional structures largely used in this art, but which has been modified in some essential particulars in accordance with my invention. It should be understood, however, that I am not limited to the particular mechanism shown and described, since this may be varied in a number of ways without departing from my invention. In these drawings, Fig. 1 represents a perspective view with parts broken away of the film operating mechanism of a motion picture machine embodying my invention; Fig. 2 is a side elevation of the same mechanism with supporting means indicated, and Fig. 3 is a detail view of Fig. 1 illustrating the intermittent sprocket driving mechanism.

Referring to the drawings, the numeral 1 indicates a base, to which is suitably secured, such as by screws 2, an upright plate 3, which supports a standard film mechanism frame 4, by means of screws 5 and 6, as shown in Fig. 2.

Secured to the base 1, by the screw 7, is a plate 8, to which is hinged at 9, a gate 10, having any suitable catch, such as a blade 11, pivoted on the screw 12 arranged to engage an arm 13 suitably supported by the upright plate 3, when in closed position, as shown in Fig. 2. The gate 10, carries an aperture plate 14, suitably secured thereto, such as by bolts 15 and 16, and has a window 17, coinciding with the aperture 18 of the plate 14. A standard film guide consisting of rollers 19 and 20, is supported above the aperture 18 by arms 21 on the axle 22. The roller 20 is secured to the axle 22, but roller 19 is loosely mounted thereon and normally urged toward roller 20 by a spring 23. These rollers are each provided with wide flanges 24 to guide the film and the yielding arrangement is provided to permit the roller 19 to adjust itself to the film and allow for slight variations in the width thereof.

The entire film mechanism is driven from an upright shaft 25, suitably journaled in the frame 4, which may be operated manually or mechanically in the usual manner, at a predetermined constant speed.

The shaft 25 carries two similar gears 26 and 27, shown as of the spiral type, which mesh with gears 28 and 29 respectively. Gear 28 is carried by a shaft 30, journaled in suitable bearings in the frame 4, which shaft carries a standard sprocket 31, usually designated as the upper sprocket, which draws the film from a standard magazine chamber not shown. As is well known, the standard sprocket is provided with sixteen teeth on its periphery, arranged to engage the holes of the film, of which there are four to a picture, consequently, four pictures are moved forward by one rotation of the sprocket. Gear 29 is carried by a shaft 32, journaled in suitable bearings in the frame 4, which shaft carries a standard sprocket 33, usually known as the take-up feed sprocket. The ratio of gears 26 and 28, and 27 and 29, respectively, is such as to impart four revolutions per second of time to sprockets 31 and 33, respectively, that is, to feed and take up respectively sixteen film pictures per second in accordance with the standard practice. The sprockets 31 and 33, are respectively provided with similar rollers 34 and 35, suitably located to hold the film thereon in engagement with its teeth, of which but one need be described. As shown in Fig. 2, the roller 34 is carried at one end of a lever 36 pivoted at 37. At its opposite end, the lever 36 is formed with a handle 38 and with a flat surfaced projection 39. A flat spring 40, screwed to a block 41, bolted to the frame 4, is slightly bent at its free end and engages the projection 39 at all times. When the roller 34 is in engagement with sprocket 31, as shown in the drawing, the spring 40 engages the upper corner of the projection 39 and tends to maintain that position. The roller may be freed of the sprocket by turning the handle 38 until the bent end of the spring engages the flat surface of projection 39, in which position the roller will be maintained. This arrangement is also provided in order that the film may be readily threaded on the sprockets.

Intermediate the sprockets 31 and 33, and below the aperture 18, there is a third sprocket 42 of the standard type, known as the intermittent sprocket, which moves the film in front of the aperture 18 at the rate of sixteen film pictures per second of time, but with an intermittent movement, in which the period of transition and the dwell together equal $\frac{1}{16}$ of a second, as above pointed out. In carrying out my invention, I increase the dwell period very closely to $\frac{1}{16}$ of a second and decrease the transition period to practically zero. This high speed of transition may be transmitted to the sprocket 42 in a number of ways; however, I accomplish this result in the following manner, which I have found highly satisfactory in practice.

The intermittent sprocket 42 is carried on one end of a shaft 43 suitably journaled in bearings in the bearing block 44 mounted in the frame 4. At its opposite end, the shaft 43 is provided with a star gear 45, of the Geneva type, having four slots 46, 47, 48 and 49, as shown in Fig. 3, arranged to be engaged successively by a pin 50 in its path of revolution and thereby actuate the sprocket 42 intermittently in a well understood manner. The pin 50 is carried by a disc 51, mounted on a shaft 52, suitably journaled in bearing block 44. The four edge surfaces 53, of the Geneva gear 45 are concave, and are arranged to be slidably engaged by a C-shaped flange 54 concentric with and projecting from the disc 51. The outer diameter of this flange is equal to the diameter of the path described by the inner face of the pin 50. The pin 50 is located midway with respect to the ends 54′ and 54″ of the flange 54 which are spaced sufficiently to permit the gear 45 to rotate freely when the pin 50 engages one of its slots, which occurs during a transition period as will appear further on. When the pin 50 is not in engagement with any of the slots 46, 47, 48, 49, which is the case, as will be shown, during the dwell, the surfaces 53 are slidably engaged by the flange 54. This prevents the rotation of the gear 45 and assists in maintaining it in a stable and proper position, because this gear is rotatable on a shaft 43 that is eccentric to the axis of rotation of disc 51.

The shaft 52 is provided with a crank arm 55 having a slot 56 and is driven through a crank pin 57, engaging said slot. The pin 57 is carried by a crank arm 58 on a shaft 59 suitably journaled in frame 4. At one end, the shaft 59 is provided with a gear 60 in mesh with a gear 61 on the driving shaft 25. At its opposite end, the shaft 59 carries a flywheel 62, which stabilizes the whole mechanism described.

As shown in Figs. 1 and 3, the crank arm 55 on shaft 52 is diametrically opposite from the pin 50. The shafts 43, 59 and 52 are parallel to each other and shaft 59 which drives the crank pin 57 is nearest the shaft 43 which carries the intermittent sprocket 42. During its revolution, in the direction of the arrow 63, the crank pin describes a path indicated by the broken line 64 in Fig. 3 and reciprocates back and forth in the slot 56 of the crank arm 55. Obviously, the pin 57 occupies its extreme position in the outer end of slot 56 when the pin 50 is in line with the three shafts 43, 59 and 52 and to the right of shaft 52.

For the purposes of this description, it is convenient to consider the positions which the pin 50 takes in the course of its movement with reference to its angular displacement from the point just above the shaft 52, which point may be called and which in Fig. 3 has been marked as the zero point. With this understanding the pin 50 when it arrives at the right hand side of the shaft 52 has described an angle of 270 degrees, at which time the crank 55 and crank pin 57 are at the 90° position. Since the crank pin 57 is driven at a constant speed, obviously the pin 50 is driven at a varying speed due to the reciprocal movement of the crank pin 57 in the slot 56, the lowest speed being at the instant the pin 50 is at 270 degrees, from which point its speed gradually increases as the crank pin 57 moves toward the inner end of the slot 56, reaching its maximum speed at 90 degrees. In this position, that is, at 90 degrees, the pin 50 has entered one of the slots of the Geneva gear 45 and reached the end thereof and drives the gear at the instant of its maximum speed. Since the gear 45 is actuated but once in a revolution of the pin 50, the shaft 52 must be driven at 16 revolutions per second, which is the ratio of gears 61 and 60. From the foregoing, it will be seen that during the dwell, the pin 50 is driven at a comparatively slow speed, but at the moment of transition, an excessive speed is imparted to it. The sprocket 42 is also provided with a roller 65 to hold the film in engagement with its teeth similar to roller 34, described above.

The film 66 is received from the feeding magazine, not shown in the drawing, on the top receiving roller 67 and threaded on the upper sprocket 31, being held thereon by the small top roller 34. This sprocket feeds at a constant speed at the rate of sixteen pictures per second, but, as the film is not to be received at a constant speed by the intermittent sprocket 42, although at the same rate of pictures per second, there is provided the usual loop guide consisting of member 68, but in addition thereto, I provide an inner loop guide 69, suitably secured to the frame 3, for the purpose of so looping the film that it may not only be moved freely by the intermittent sprocket 42, but that the energy stored in the loop of the resilient film may, when liberated, propel the film downwardly toward the sprocket 42. From the looping members 68, 69, the film passes over the guide rollers 19, 20, in front of the aperture plate 14, against which it is held by a tension plate 70, which, as will presently be described, holds the film plate in front of the aperture 18. On leaving the plate 14, the film is engaged by the intermittent sprocket 42 against which it is held by the roller 65. On leaving the sprocket 42 the film is allowed to loop to take up the irregular feeding due to the intermittent movement, and is next received by the take-up feed sprocket 33, against which it is held by the roller 35. The sprocket 33 feeds the film at constant speed at the rate of sixteen pictures per second to the winding magazine, not shown in the drawings.

As above described, in conjunction with the high speed intermittent feed mechanism, I make use of the elasticity of the film to facilitate that movement by giving to the loop such curvature that by its resilient rebound, it gives to the straight part of the film an impetus in the direction of the intermittent sprocket. As shown in Fig. 2, the film on leaving sprocket 31 is directed to the curved guide member 68. The curvature of guide member 68 is such as to give to the film a downward loop, the backward looping between sprocket 31 and guide 68 being prevented by the stiffness of the film and by the fact that it is constantly being fed forward by the sprocket 31. Since the tension plate 70 normally grips the film between it and the aperture plate 14, the film is caused to loop within the member 68 and store up energy, and in order to direct this energy in a straight line downwardly toward the intermittent sprocket, I have placed the second loop forming member 69 within the loop member 68, substantially at an angle of 45 degrees to the straight line along which the film is to be directed, so that the film will strike the member 69, doubling on itself, so to speak, and be urged downwardly in the desired direction by its resilient rebound when released by the tension plate 70.

The film 66 is securely held against the aperture plate 14 by the tension plate 70 at all times except at the instant of transition, when it is released. I accomplish the intermittent release of the film synchronously with the intermittent movement of the sprocket 42 by providing the tension plate 70, which is loosely pivoted on a rod 71, with two similar bosses 72, both of which are shown in Fig. 1, and one of them in Fig. 2, and these bosses serve as a fulcrum for a lever frame 73, also pivoted on rod 71. As shown in Fig. 1, the lever frame 73 and the tension plate 70 have similar windows 74, 75, respectively coinciding with aperture 18. The lever frame 73 is provided at its lower end with a tail 76 bent over the shaft 43 between the teeth carrying surfaces of sprocket 42. The shaft 52 carries a cam 77 having a flat surface in a plane at right angles to the radius of disc 51 on which pin 50 is located. This cam normally engages with its cylindrical part the tail 76 and pushes the tension plate 70 against the aperture plate 14, thereby clamping the film between it and plate 14; but at the instant the pin 50 engages the Geneva gear 45, the flat surface of cam 77 faces the tail piece 76 and frees the latter and thereby releases the film at the instant of transition.

From the foregoing description it will be understood that the excessive acceleration of the film during its transition is due to the fact that the two shafts 59 and 52 are spaced apart. If these two shafts were in axial alignment, the pin 57 would describe a circular path that is coaxial with the disc 51 and this disc together with pin 57 would rotate with uniform speed. The intermittent duplex or excessive acceleration of the film is therefore a function of the eccentricity of the shafts 59 and 52, and will be the greater the more these shafts are spaced apart, it being, of course, understood that if they are separated more than indicated in the drawing, the crank 58 and the crank arm 55 must be lengthened accordingly, and the shaft 43 must then be located at the proper distance so that the pin 50 may enter one of the radial slots of the Geneva gear at the proper time. The object of the invention, however, is sufficiently secured when the proportional dimensions indicated in the drawing are adhered to. With these proportional dimensions the transition period of the film is so short that the eye is not sensibly affected by the same. The passage of the film 66 through the apparatus is sufficiently explained by the foregoing description, but by way of recapitulation, it is pointed out that the film is propelled by the upper sprocket and by the lower take-up feed sprocket with the uniform speed of about 16 pictures per second and that it is moved with very much greater speed by the intermittent sprocket past the aperture in front of which the condensing lens is located in the usual way. In order to make this excessive transition speed practically possible the film is looped before it passes the aperture and is freed from all restraint while it thus passes but is temporarily clamped when a picture has arrived in position before the aperture. Furthermore, the loop of the film is given such form as to act by its elastic rebound to start it from its position of rest before the aperture into the rectilinear path before and past the aperture. It will be seen that the acceleration of the film by the intermittent sprocket, the unclamping of it during the passage of a picture before the aperture and its resilient starting by the loop from its position of rest, cooperate to make the period of transition exceedingly small and the period of dwell a maximum.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. In a motion picture projection apparatus, the combination of a film with an aperture plate, a film looping member, a guide member arranged to direct the looped portion of the film toward the aperture plate, and a tension plate actuated to intermittently clamp the film against said aperture plate.

2. A motion picture projection machine comprising an intermittent sprocket, a Geneva gear for actuating said sprocket, an aperture plate, a tension plate, a lever normally pushing the tension plate against the aperture plate, a driven shaft carrying a pin arranged to actuate said Geneva gear and having a cam arranged to release said lever member when the Geneva gear is actuated.

3. A motion picture projection machine comprising an intermittent sprocket, a Geneva gear arranged to drive said sprocket, a film tension plate located above the sprocket, a lever arranged to actuate said plate, and a driven shaft carrying a pin arranged to actuate the Geneva gear and having a cylindrical cam with a flat surface in a plane at right angles to the radius on which said pin is carried, said cam with its cylindrical portion operatively engaging said lever.

In witness whereof I have hereunto set my hand this fourth day of May, 1921.

CHARLES F. PERHAM.